United States Patent
Xu et al.

(10) Patent No.: US 10,381,854 B2
(45) Date of Patent: Aug. 13, 2019

(54) DIGITAL CONTROLLED BATTERY CHARGING SYSTEM

(71) Applicant: Chengdu Monolithic Power Systems Co., Ltd., Chengdu (CN)

(72) Inventors: Min Xu, Hangzhou (CN); Qiming Zhao, Hangzhou (CN); Xiaoqing Li, Hangzhou (CN)

(73) Assignee: Chengdu Monolithic Power Systems co., Ltd. (CN)

( * ) Notice: Subject to any disclaimer, the term of this patent is extended or adjusted under 35 U.S.C. 154(b) by 737 days.

(21) Appl. No.: 15/011,299

(22) Filed: Jan. 29, 2016

(65) Prior Publication Data

US 2016/0226264 A1 Aug. 4, 2016

(30) Foreign Application Priority Data

Feb. 2, 2015 (CN) .............................. 201510051503

(51) Int. Cl.
*H02J 7/00* (2006.01)

(52) U.S. Cl.
CPC .......... *H02J 7/007* (2013.01); *H02J 7/0052* (2013.01); *H02J 2007/0059* (2013.01); *H02J 2007/0096* (2013.01)

(58) Field of Classification Search
None
See application file for complete search history.

(56) References Cited

U.S. PATENT DOCUMENTS

| 8,933,674 B2* | 1/2015 | Lee .......................... H02M 7/12 323/222 |
| 2010/0226149 A1* | 9/2010 | Masumoto .......... H02M 1/4225 363/20 |
| 2011/0148374 A1* | 6/2011 | Gizara .................. H02M 3/157 323/282 |
| 2012/0187968 A1* | 7/2012 | Hashimoto ........ G01R 31/2617 324/750.01 |
| 2013/0002221 A1* | 1/2013 | Wang .................... H02M 3/158 323/283 |
| 2014/0152242 A1 | 6/2014 | Bai et al. |
| 2014/0292300 A1* | 10/2014 | Yan ........................ H02M 3/157 323/288 |
| 2015/0102787 A1 | 4/2015 | Xu et al. |
| 2015/0123480 A1 | 5/2015 | Xu et al. |
| 2015/0194826 A1 | 7/2015 | Xu et al. |
| 2015/0372613 A1* | 12/2015 | Houston ............... H02M 3/158 307/31 |

* cited by examiner

*Primary Examiner* — Robert Grant
*Assistant Examiner* — Tynese V McDaniel
(74) *Attorney, Agent, or Firm* — Perkins Coie LLP

(57) ABSTRACT

A battery charging system has a switching circuit and a control circuit. The switching circuit has a first switch, and the control circuit has a plurality of analog control loops and a digital control unit. Each of the analog control loops provides a loop control signal based on a corresponding feedback signal, a corresponding reference signal and a slope compensation signal. The digital control unit provides a switching control signal to control the first switch based on the plurality of analog control loops and a time period control signal, and the digital control unit turns ON or turns OFF the first switch automatically in response to one of the plurality of analog control loops.

18 Claims, 6 Drawing Sheets

DIGITAL CONTROLLED BATTERY CHARGING SYSTEM

CROSS-REFERENCE TO RELATED APPLICATION

This application claims the benefit of CN application No. 201510051503.6, filed on Feb. 2, 2015, and incorporated herein by reference.

TECHNICAL FIELD

The present invention relates to electrical circuit, more particularly but not exclusively relates to battery charging system.

BACKGROUND

With development of portable electronic device, battery charging system is widely used in application of portable electronic device. FIG. 1 shows a conventional battery charging system 100 employing step-down converter topology. Battery charging system 100 comprises a plurality of control loops, and each control loop comprises an error amplifier and a compensation network. Take a battery voltage control loop as an example, during each switching period, a RS flip-flop FF0 is set by a clock signal CLK to turn ON a high-side switch PM1 and turn OFF a low-side switch PM2 by a switching control signal PWM. A current following through high-side switch PM1 and an inductor L1 charges an output capacitor Cout. A battery voltage Vout increases and a feedback signal Vx1 representing battery voltage Vout increases accordingly. An error amplifier A receives feedback signal Vx1 and a battery voltage reference signal REF1, and provides an error amplifier signal Vcom1. When error amplifier signal Vcom1 decreases less than a peak signal PK, a comparison circuit CP is configured to provide a signal to reset RS flip-flop FF0, and switching control signal PWM is configured to turn OFF high-side switch PM1 and turn ON low-side switch PM2. Output capacitor Cout is configured to power a load RL and battery voltage Vout decreases. When clock signal CLK set RS flip-flop FF0 again, a new switching period starts.

As shown in FIG. 1, each control loop needs at least one error amplifier, and each error amplifier needs different compensation network for loop stability, as a result, battery charging system 100 becomes complicated, and has poor transplantation for different power stages. Besides, transition between each loop is hard to design per error amplifier signals Vcom1~Vcomn may be very closed to each other.

SUMMARY

It is one of the objects of the present invention to provide a battery charging system and a control circuit for the battery charging system to resolve one or more technical problems.

One embodiment of the present invention discloses a battery charging system, comprising: an input terminal, configured to receive an input voltage and an input current; an output terminal, coupled to a battery and configured to provide a battery voltage and a battery charging current to charge the battery; a first switch, coupled between the input terminal and the output terminal; an input voltage control loop, configured to receive an input voltage feedback signal representative of the input voltage, a slope compensation signal and an input voltage reference signal, and configured to provide a first loop control signal via comparing the input voltage reference signal with a first compounded signal comprising the input voltage feedback signal and the slope compensation signal; an input current control loop, configured to receive an input current feedback signal representative of the input current of the battery charging system, the slope compensation signal and an input current reference signal, and configured to provide a second loop control signal via comparing the input current reference signal with a second compounded signal comprising the input current feedback signal and the slope compensation signal; a battery voltage control loop, configured to receive a battery voltage feedback signal representative of the battery voltage, the slope compensation signal and a battery voltage reference signal, and configured to provide a third loop control signal via comparing the battery voltage reference signal with a third compounded signal comprising the battery voltage feedback signal and the slope compensation signal; a battery charging current control loop, configured to receive a battery charging current feedback signal representative of the battery charging current, the compensation signal, and a battery charging current reference signal, and configured to provide a fourth loop control signal via comparing the battery charging current reference signal with a fourth compounded signal comprising the battery charging current feedback signal and the slope compensation signal; and a digital control unit, configured to receive the first loop control signal, the second loop control signal, the third loop control signal and the fourth loop control signal, and configured to provide a switching control signal to control the first switch automatically in response to one of the input voltage control loop, the input current control loop, the battery voltage control loop and the battery charging current control loop.

Another embodiment of the present invention discloses a battery charging system having an input terminal and an output terminal coupled to a battery, comprising: a first switch, coupled between the input terminal of the battery charging system and the output terminal of the battery charging system; a plurality of analog control loops, configured to receive a plurality of reference signals, a plurality of feedback signals and a slope compensation signal, and configured to provide a plurality of loop control signals based on the plurality of reference signals, the plurality of feedback signals and the slope compensation signal; and a digital control unit, configured to receive the plurality of loop control signals, and configured to provide a switching control signal to control the first switch automatically in response to one of the plurality of analog control loops, wherein when one of the plurality of loop control signals transits to a first state, the switching control signal is configured to turn OFF the first switch.

Yet another embodiment of the present invention discloses a control circuit for a battery charging system, the battery charging system having a switching circuit, and the control circuit comprising: a plurality of analog control loops, configured to receive a plurality of reference signals, a plurality of feedback signals and a slope compensation signal, and configured to provide a plurality of loop control signals based on the plurality of reference signals, the plurality of feedback signals and the slope compensation signal; a digital control unit, configured to receive the plurality of loop control signals and provide a switching control signal to control the switching circuit based on the plurality of loop control signals, the digital control unit is further configured to provide a digital slope control signal to adjust an amplitude of the slope compensation signal, wherein the digital control unit automatically chooses one of the plurality of analog control loops to control the switching circuit; and a slope generating unit, configured to provide the slope compensation signal based on the digital slope control signal and the switching control signal.

In one embodiment, each analog control loop employs a comparison circuit to replace complicated error amplifier, and transition among analog control loops are distinguishable and cleared. The control circuit is compatible and transplantable for power stages having different specs.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to battery charging system and associated control circuit. As used hereinafter, the term "couple" generally refers to multiple ways including a direct connection with an electrical conductor and an indirect connection through intermediaries, such as diodes, resistors, and/or capacitors.

Figure 1:
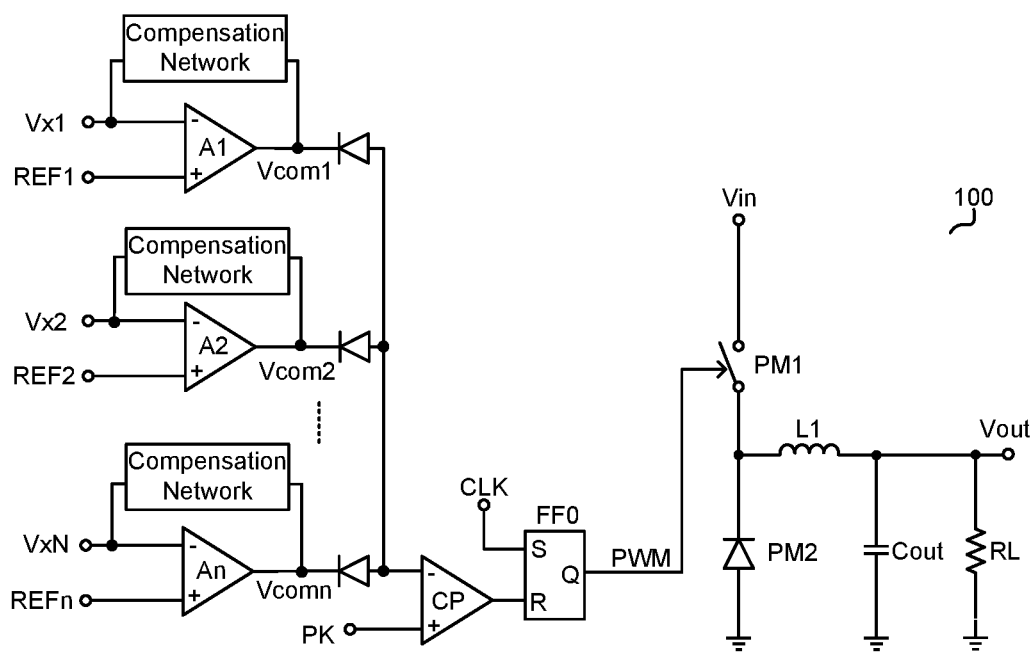
FIG. 1 illustrates a conventional battery charging system 100.
Figure 2:
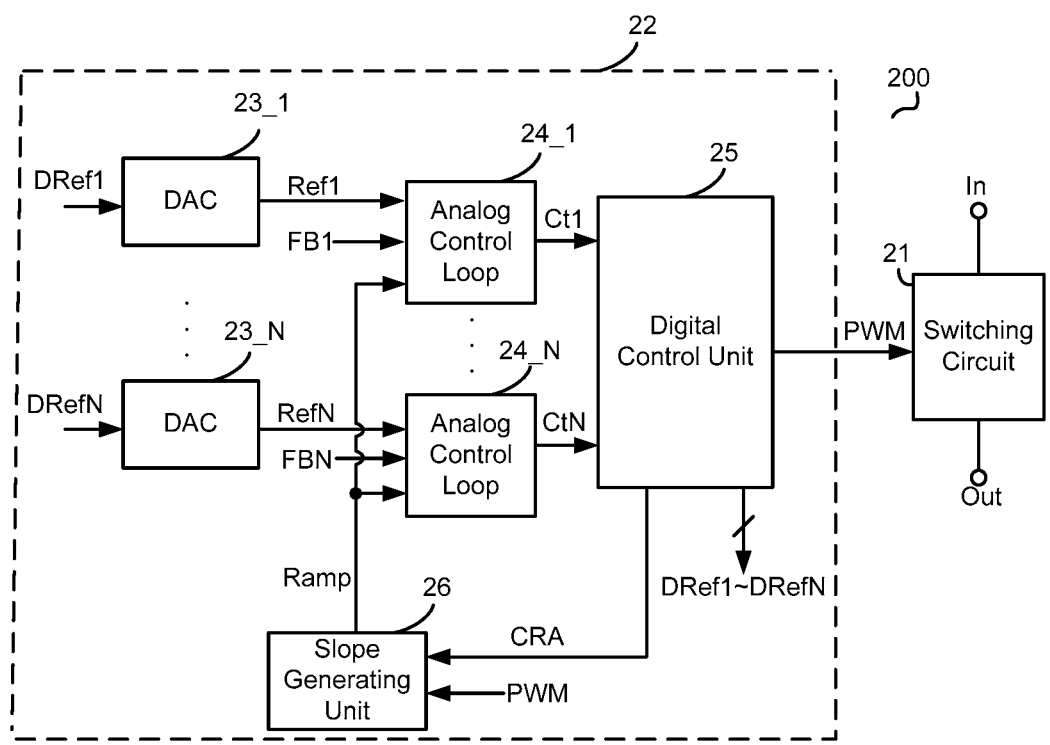
FIG. 2 schematically illustrates a circuit block diagram of a battery charging system 200 according to an embodiment of the present invention.

FIG. 2 schematically illustrates a circuit block diagram of a battery charging system 200 according to an embodiment of the present invention. Battery charging system 200 comprises a switching circuit 21 and a control circuit 22. Switching circuit 21 comprises an input terminal In and an output terminal Out. Input terminal In may be coupled to a power supply, and output terminal Out may be coupled to a battery. Switching circuit 21 comprises a switch. Control circuit 22 is configured to provide switching control signal PWM to turn ON and turn OFF the switch in switching circuit 21.

Control circuit 22 comprises a plurality of analog control loops 24_1-24_N, a digital control unit 25, a plurality of digital-to-analog conversion (DAC) units 23_1-23_N and a slope generating unit 26, where N is an integer larger than 1. Analog control loops 24_1-24_N are configured to receive a slope compensation signal Ramp, reference signals Ref1-RefN, and feedback signals FB1-FBN respectively, and provide a plurality of loop control signals Ct1-CtN. Each analog control loop 24_x is configured to provide a loop control signal Ctx based on corresponding reference signal Refx, corresponding feedback signal FBx and the slope compensation signal Ramp, where x is an integer larger than or equal 1, and less than or equal N. Digital control unit 25 is coupled to analog control loops 24_1-24_N to receive loop control signals Ct1-CtN, and provides switching control signal PWM based on loop control signals Ct1-CtN and a time period control signal. Digital control unit 25 is further configured to provide a plurality of digital reference signals Dref1-DrefN and a digital slope control signal CRA. Digital control unit 25 is configured to turn ON or turn OFF the switch in switching circuit 21 automatically based on one of the analog control loops 24_1-24_N. Digital-to-analog conversion units 23_1-23_N are coupled to digital control unit 25 to receive corresponding digital reference signals DRef1-DRefN, and provide reference signals Ref1-RefN. Take digital-to-analog conversion unit 23_x as one example, digital-to-analog conversion unit 23_x is configured to receive digital reference signal DRefx, and provides reference signal Refx based on digital reference signal DRefx. Slope generating unit 26 is coupled to digital control unit 25 to receive digital slope control signal CRA and switching control signal PWM, and provides slope compensation signal Ramp based on digital slope control signal CRA and switching control signal PWM. As shown in FIG. 2, control circuit 22 is compatible and transplantable for different power stages per employing digital control unit 25.

Figure 3:
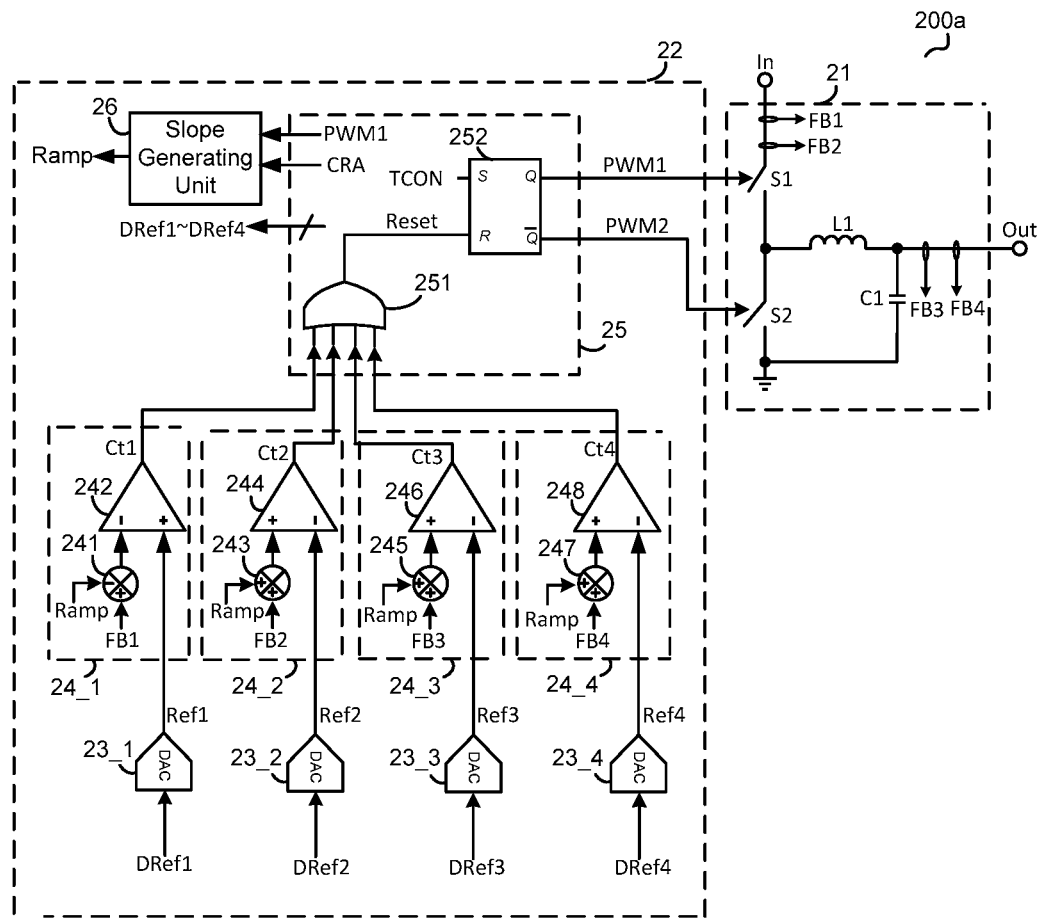
FIG. 3 schematically illustrates a battery charging system 200a according to an embodiment of the present invention.

FIG. 3 schematically illustrates a battery charging system 200a according to an embodiment of the present invention. Battery charging system 200a comprises switching circuit 21 and control circuit 22. In the embodiment shown in FIG. 3, switching circuit 21 employs step-down topology as one example. However, one of ordinary skill in the art should appreciate that switching circuit 21 may employ other suitable topology. Switching circuit 21 comprises a switch S1, a switch S2, an inductor L1, and a capacitor C1. Switch S1 and switch S2 may be any suitable controllable semiconductor device, e.g., Metal Oxide Semiconductor Field Effect Transistor (MOSFET), Junction Field Effect Transistor (JFET), Insulated Gate Bipolar Transistor (IGBT) and so on. One terminal of switch S1 is coupled to input terminal In of switching circuit 21, the other terminal of switch S1 is coupled to one terminal of switch S2, the other terminal of switch S2 is coupled to a system ground. One terminal of inductor L1 is coupled to a common terminal of switch S1 and switch S2, the other terminal of inductor L1 is coupled to one terminal of capacitor C1, and the other terminal of capacitor C1 is coupled to the system ground. A common terminal of inductor L1 and capacitor C1 is coupled to output terminal Out of switching circuit 21.

Control circuit 22 comprises digital-to-analog conversion units 23_1-23_4, analog control loops 24_1-24_4, digital control unit 25 and slope generating unit 26. Battery charging system 200a takes four digital-to-analog conversion units 23_1-23_4 and four analog control loops 24_1-24_N as one example, however, one of ordinary skill in the art should also appreciate that control circuit 22 may comprises more digital-to-analog conversion units and analog control loops.

Digital-to-analog conversion unit 23_1 is configured to receive digital reference signal DRef1 and provide reference signal Ref1 via digital-to-analog converting. Digital-to-analog conversion unit 23_2 is configured to receive digital reference signal DRef2 and provide reference signal Ref2 via digital-to-analog converting. Digital-to-analog conversion unit 23_3 is configured to receive digital reference signal DRef3 and provide reference signal Ref3 via digital-to-analog converting. Digital-to-analog conversion unit 23_4 is configured to receive digital reference signal DRef4 and provide reference signal Ref4 via digital-to-analog converting.

In one embodiment, analog control loop 24_1 is an input voltage control loop. The input voltage control loop comprises an operation circuit 241 and a comparison circuit 242. Operation circuit 241 comprises a first input terminal configured to receive feedback signal FB1 representing an input voltage, a second input terminal configured to receive slope compensation signal Ramp, and an output terminal configured to provide a difference between feedback signal FB1 and slope compensation signal Ramp (FB1-Ramp). Comparison circuit 242 comprises an inverting terminal coupled to the output terminal of operation circuit 241 and a non-inverting terminal coupled to the output terminal of digital-to-analog conversion unit 23_1 to receive reference signal Ref1, and an output terminal configured to provide a loop control signal Ct1 to control the input voltage. In one embodiment, analog control loop 24_2 is an input current control loop. The input current control loop comprises an operation circuit 243 and a comparison circuit 244. Operation circuit 243 comprises a first input terminal configured to receive feedback signal FB2 representing an input current, a second input terminal configured to receive slope compensation signal Ramp, and an output terminal configured to provide a summation of feedback signal FB2 and slope compensation signal Ramp (FB2+Ramp). Comparison circuit 244 comprises a non-inverting terminal coupled to the output terminal of operation circuit 243 and an inverting terminal coupled to the output terminal of digital-to-analog conversion unit 23_2 to receive reference signal Ref2, and an output terminal configured to provide a loop control signal Ct2 to control the input current. In one embodiment, analog control loop 24_3 is a battery voltage control loop. The battery voltage control loop comprises an operation circuit 245 and a comparison circuit 246. Operation circuit 245 comprises a first input terminal configured to receive feedback signal FB3 representing a battery voltage, a second input terminal configured to receive slope compensation signal Ramp, and an output terminal configured to provide a summation of feedback signal FB3 and slope compensation signal Ramp (FB3+Ramp). Comparison circuit 246 comprises a non-inverting terminal coupled to the output terminal of operation circuit 245 and an inverting terminal coupled to the output terminal of digital-to-analog conversion unit 23_3 to receive reference signal Ref3, and an output terminal configured to provide a loop control signal Ct3 to control the battery voltage. In one embodiment, analog control loop 24_4 is a battery charging current control loop. The battery charging current control loop comprises an operation circuit 247 and a comparison circuit 248. Operation circuit 247 comprises a first input terminal configured to receive feedback signal FB4 representing a battery charging current, a second input terminal configured to receive slope compensation signal Ramp, and an output terminal configured to provide a summation of feedback signal FB4 and slope compensation signal Ramp (FB4+Ramp). Comparison circuit 248 comprises a non-inverting terminal coupled to the output terminal of operation circuit 247 and an inverting terminal coupled to the output terminal of digital-to-analog conversion unit 23_4 to receive reference signal Ref4, and an output terminal configured to provide a loop control signal Ct4 to control the battery charging current. In the embodiment shown in FIG. 3, analog control loops 24_1-24_4 receives slope compensation signal Ramp, however, in other embodiments, analog control loops 24_1-24_4 may employ slope compensation signals having different amplitudes.

Digital control unit 25 comprises an OR gate 251 and a RS flip-flop 252. OR gate 251 comprises a first input terminal, a second input terminal, a third input terminal, a fourth input terminal and an output terminal, wherein the first input terminal is coupled to the output terminal of comparison circuit 242 to receive loop control signal Ct1, the second input terminal is coupled to the output terminal of comparison circuit 244 to receive loop control signal Ct2, the third input terminal is coupled to the output terminal of comparison circuit 246 to receive loop control signal Ct3, the fourth input terminal is coupled to the output terminal of comparison circuit 248 to receive loop control signal Ct4, and the output terminal is configured to provide a reset signal Reset. RS flip-flop 252 comprises a set terminal S, a reset terminal R, a non-inverting terminal Q and an inverting terminal /Q, wherein set terminal S is configured to receive a time period control signal TCON, reset terminal R is coupled to the output terminal of OR gate 251, the non-inverting output terminal Q is configured to provide switching control signal PWM1 to turn ON and turn OFF switch S1, and the inverting terminal /Q is configured to provide switching control signal PWM2 to turn ON and turn OFF switch S2. When one of loop control signals Ct1-Ct4 becomes high voltage level, corresponding analog control loop works to turn OFF switch S1. In one embodiment, switch S1 is turned ON based on time period control signal TCON, and an OFF time period of switch S1 is controlled by time period control signal TCON. Digital control unit 25 is further configured to provide digital slope control signal CRA and digital reference signals DRef1-DRef4. In one embodiment, digital slope control signal CRA and digital reference signals DRef1-DRef4 may be stored in an on-chip memory, or may be set via a communication bus, such as Inter-Integrated Circuit (I2C), Power Management Bus (PMBus), System Management Bus (SMBus) and so on.

In the embodiment shown in FIG. 3, analog control loops 24_1-24_4 employs comparison circuits to provide loop control signals Ct1-Ct4 which are logic signals having high voltage level or low voltage level, and when any one of loop control signals Ct1-Ct4 becomes high voltage level, digital control unit 25 is configured to turn OFF switch S1 automatically based on corresponding analog control loop via OR gate 251, as a result, reliable transition between different analog control loops is automatically achieved with simple circuit structure, while complex error amplifier circuits and associated compensation network are eliminated.

Figure 4:
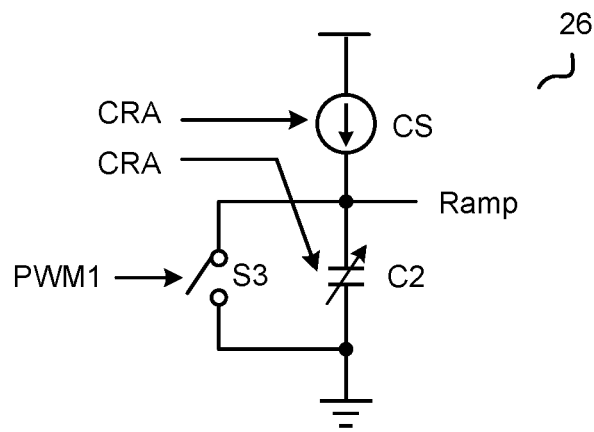
FIG. 4 schematically illustrates a slope generating unit 26 according to an embodiment of the present invention.

FIG. 4 schematically illustrates a slope generating unit 26 according to an embodiment of the present invention. Slope generating unit 26 comprises a switch S3, a current source CS and a capacitor C2. Capacitor C2 has a first terminal configured to receive a charging current provided by current source CS and a second terminal coupled to the system ground, and a voltage across capacitor C2 is slope compensation signal Ramp. Switch S3 is coupled to capacitor C2 in parallel. Switch S3 has a first terminal coupled to the first terminal of capacitor C2, a second terminal coupled to the second terminal of capacitor C2, and a control terminal configure to receive switching control signal PWM1. Switch S3 is turned ON and turned OFF based on switching control signal PWM1. In one embodiment, when switch S1 is turned ON by switching control signal PWM1, switch S3 is turned OFF, capacitor C2 is charged by current source CS, slope compensation signal Ramp increases; and when switch S1 is turned OFF by switching control signal PWM1, switch S3 is turned ON, capacitor C2 is discharged through switch S3, slope compensation signal Ramp decreases to zero volt. In one embodiment, the charging current provided by current source CS is adjusted to adjust an increasing slope rate of slope compensation signal Ramp based on digital slope control signal CRA, as a result, amplitude of slope compensation signal Ramp is adjusted. In one embodiment, capacitance of capacitor C2 is adjusted to adjust an increasing slope rate of slope compensation signal Ramp based on digital slope control signal CRA, as a result, amplitude of slope compensation signal Ramp is adjusted.

Figure 5:
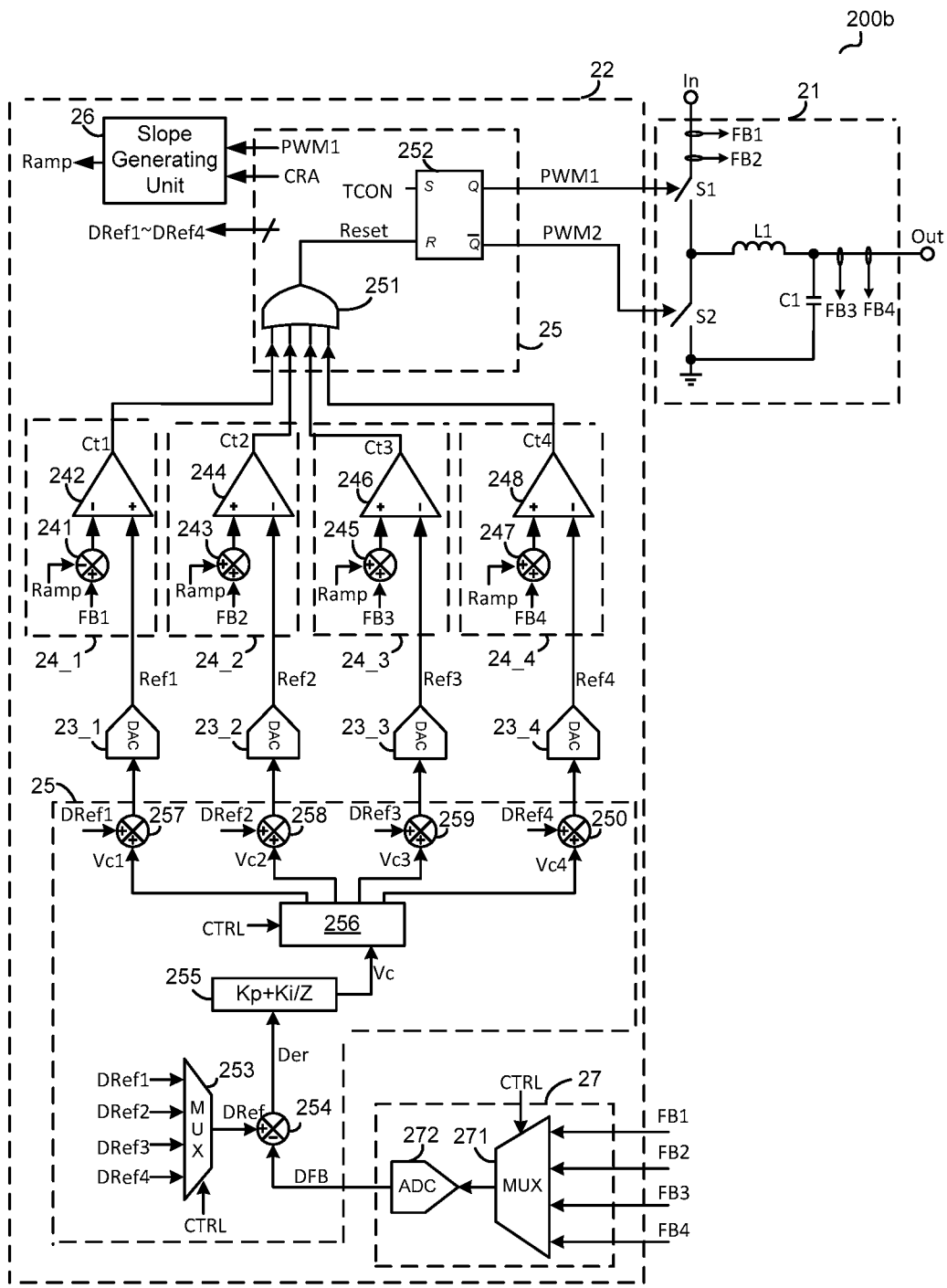
FIG. 5 schematically illustrates a battery charging system 200b according to an embodiment of the present invention.

FIG. 5 schematically illustrates a battery charging system 200b according to an embodiment of the present invention. As shown in FIG. 5, battery charging system 200b further comprises an analog-to-digital conversion unit 27. Analog-to-digital conversion unit 27 comprises a multiplexer 271 and an analog-to-digital conversion (ADC) device 272. Multiplexer 271 is configured to receive feedback signals FB1-FB4, provides one of feedback signals FB1-FB4 at an output terminal based on a control signal CTRL. Analog-to-digital conversion device 272 has an input terminal coupled to the output terminal of multiplexer 271, and an output terminal configured to provide a digital signal DFB via analog-to-digital converting of one of feedback signals FB1-FB4. Control signal CTRL is configured to control a timing sequence of analog-to-digital converting, e.g., at a first time, converting feedback signal FB1 to digital signal DFB, at a second time, converting feedback signal FB2 to digital signal DFB, at a third time, converting feedback signal FB3 to digital signal DFB, and at a fourth time, converting feedback signal FB4 to digital signal DFB.

Continuing with FIG. 5, digital control unit 25 further comprises a multiplexer 253, an operation module 254, a digital compensation loop 255, an output module 256, operation modules 257-259 and 250. Multiplexer 253 is configured to receive digital reference signals DRef1-DRef4, and is configured to choose one of digital reference signals DRef1-DRef4 as a digital reference signal DRef at its output terminal based on control signal CTRL. Operation module 254 has a first input terminal coupled to the output terminal of analog-to-digital conversion device 272 to receive digital signal DFB, a second input terminal coupled to the output terminal of multiplexer 253 to receive digital reference signal DRef, and an output terminal configured to provide a digital error signal Der based on a difference between digital reference signal DRef and digital signal DFB (DRef-DFB). Digital compensation loop 255 is coupled to the output terminal of operation module 254 to receive digital error signal Der, and is configured to provide an error compensation signal Vc via a digital compensating. The digital compensating may comprise Proportional Integral (PI) compensating, Proportional Integral Differential (PID) compensating, and non-linear compensating. Output module 256 is coupled to the output terminal of digital compensation loop 255, and is configured to provide error compensation signals Vc1-Vc4 based on control signal CTRL and error compensation signal Vc. Error compensation signals Vc1-Vc4 may be either positive or negative. When analog-to-digital conversion device 272 provides digital signal DFB based on feedback signal FB1, multiplexer 253 provides digital reference signal DRef based on digital reference signal DRef1, digital compensation loop 255 is configured to provide error compensation signal Vc based on digital reference signal DRef1 and feedback signal FB1, and output module 256 is configured to provide error compensation signal Vc to operation module 257 as an input voltage error compensation signal Vc1. When analog-to-digital conversion device 272 provides digital signal DFB based on feedback signal FB2, multiplexer 253 provides digital reference signal DRef based on digital reference signal DRef2, digital compensation loop 255 is configured to provide error compensation signal Vc based on digital reference signal DRef2 and feedback signal FB2, and output module 256 is configured to provide error compensation signal Vc to operation module 258 as an input current error compensation signal Vc2. When analog-to-digital conversion device 272 provides digital signal DFB based on feedback signal FB3, multiplexer 253 provides digital reference signal DRef based on digital reference signal DRef3, digital compensation loop 255 is configured to provide error compensation signal Vc based on digital reference signal DRef3 and feedback signal FB3, and output module 256 is configured to provide error compensation signal Vc to operation module 259 as a battery voltage error compensation signal Vc3. When analog-to-digital conversion device 272 provides digital signal DFB based on feedback signal FB4, multiplexer 253 provides digital reference signal DRef based on digital reference signal DRef4, digital compensation loop 255 is configured to provide error compensation signal Vc based on digital reference signal DRef4 and feedback signal FB4, and output module 256 is configured to provide error compensation signal Vc to operation module 250 as a battery charging current error compensation signal Vc4. Operation module 257 comprises a first input terminal coupled to output module 256 to receive input voltage error compensation signal Vc1, a second input terminal configured to receive digital reference signal DRef1, and an output terminal coupled to an input terminal of digital-to-analog conversion unit 23_1 to provide a summation of digital reference signal DRef1 and input voltage error compensation signal Vc1. Digital-to-analog conversion unit 23_1 has an output terminal configured to provide reference signal Ref1 based on the summation of digital reference signal DRef1 and input voltage error compensation signal Vc1. Operation module 258 comprises a first input terminal coupled to output module 256 to receive input current error compensation signal Vc2, a second input terminal configured to receive digital reference signal DRef2, and an output terminal coupled to an input terminal of digital-to-analog conversion unit 23_2 to provide a summation of digital reference signal DRef2 and input current error compensation signal Vc2. Digital-to-analog conversion unit 23_2 has an output terminal configured to provide reference signal Ref2 based on the summation of digital reference signal DRef2 and input current error compensation signal Vc2. Operation module 259 comprises a first input terminal coupled to output module 256 to receive battery voltage error compensation signal Vc3, a second input terminal configured to receive digital reference signal DRef3, and an output terminal coupled to an input terminal of digital-to-analog conversion unit 23_3 to provide a summation of digital reference signal DRef3 and battery voltage error compensation signal Vc3. Digital-to-analog conversion unit 23_3 has an output terminal configured to provide reference signal Ref3 based on the summation of digital reference signal DRef3 and battery voltage error compensation signal Vc3. Operation module 250 comprises a first input terminal coupled to output module 256 to receive battery charging current error compensation signal Vc4, a second input terminal configured to receive digital reference signal DRef4, and an output terminal coupled to an input terminal of digital-to-analog conversion unit 23_4 to provide a summation of digital reference signal DRef4 and battery charging current error compensation signal Vc4. Digital-to-analog conversion unit 23_4 has an output terminal configured to provide reference signal Ref4 based on the summation of digital reference signal DRef4 and battery charging current error compensation signal Vc4.

Reference signals Ref1-Ref4 are calibrated by error compensation signals Vc1-Vc4 to reduce a static error caused by slope compensation signal Ramp. In the embodiment shown in FIG. 5, digital control unit 25 employs only one digital compensation loop 255 to calibrate reference signals Ref1-Ref4.

Figure 6:
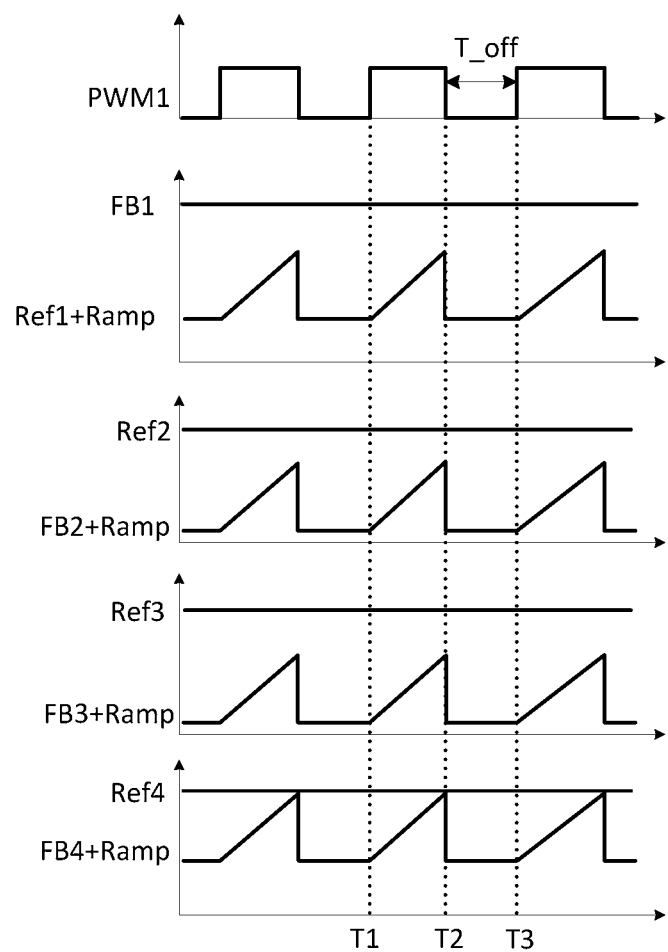
FIG. 6 shows waveforms of battery charging system 200b shown in FIG. 5 according to an embodiment of the present invention.

FIG. 6 shows waveforms of battery charging system 200b shown in FIG. 5 according to an embodiment of the present invention. The waveforms shown in FIG. 6 is switching control signal PWM1, input voltage feedback signal FB1, a summation of reference signal Ref1 and slope compensation signal Ramp, reference signal Ref2, the summation of input current feedback signal FB2 and slope compensation signal Ramp, reference signal Ref3, the summation of battery voltage feedback signal FB3 and slope compensation signal Ramp, reference signal Ref4, and the summation of battery charging current feedback signal FB4 and slope compensation signal Ramp. In the embodiment shown in FIG. 6, switch S1 is controlled by analog control loop 24_4 as one example. One of ordinary skill in the art should understand that switch S1 may also be controlled by one of analog control loops 24_1-24_3. At time T1, switching control signal PWM1 becomes high voltage level to turn ON switch S1, slope compensation signal Ramp increases. At time T2, the summation of battery charging current feedback signal FB4 and compensation signal Ramp increases larger than reference signal Ref4, and loop control signal Ct4 becomes high voltage level. Meanwhile, the summation of reference signal Ref1 and slope compensation signal Ramp is less than input voltage feedback signal FB1, and loop control signal Ct1 is low voltage level; the summation of input current feedback signal FB2 and slope compensation signal Ramp is less than reference signal Ref2, and loop control signal Ct2 is low voltage level; the summation of battery voltage feedback signal FB3 and slope compensation signal Ramp is less than reference signal Ref3, and loop control signal Ct3 is low voltage level. Reset signal Reset becomes high voltage level to reset RS flip-flop 252 since loop control signal Ct4 becomes high voltage level, switching control signal PWM1 becomes low voltage level to turn OFF switch S1 accordingly, and slope compensation signal Ramp decreases to zero quickly. At time T3, OFF time period T_off of switch S1 equals to a predetermine time period controlled by time period control signal TCON, and switching control signal PWM1 becomes high voltage level to turn ON switch S1 again, a new switching period starts.

In summary, battery charging system 200b is able to automatically choose one of analog control loops 24_1-24_4 to turn OFF switch S1 with simple structure and without complex error amplifier.

Figure 7:
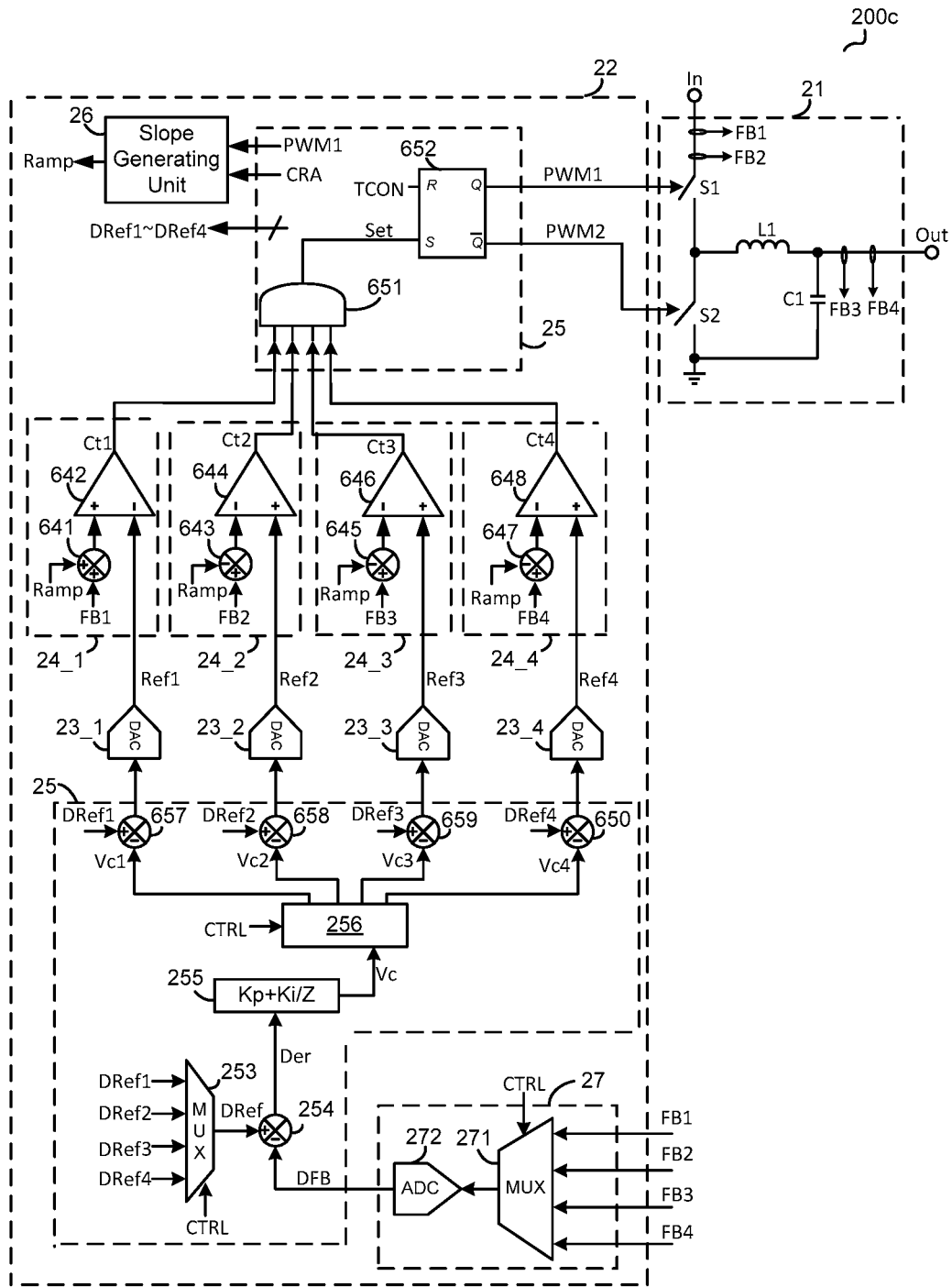
FIG. 7 schematically illustrates a battery charging system 200c according to an embodiment of the present invention.

FIG. 7 schematically illustrates a battery charging system 200c according to an embodiment of the present invention. Battery charging system 200c is configured to automatically choose one of analog control loops 24_1-24_4 to turn ON switch S1.

Analog control loop 24_1 comprises an operation circuit 641 and a comparison circuit 642. Operation circuit 641 is configured to receive input voltage feedback signal FB1 and slope compensation signal Ramp, and provide a summation of input voltage feedback signal FB1 and slope compensation signal Ramp at an output terminal. Comparison circuit 642 has a non-inverting terminal coupled to the output terminal of operation circuit 641, an inverting terminal coupled to the output terminal of digital-to-analog conversion unit 23_1 to receive reference signal Ref1, and an output terminal configured to provide input voltage loop control signal Ct1. Analog control loop 24_2 comprises an operation circuit 643 and a comparison circuit 644. Operation circuit 643 has a first input terminal configured to receive input current feedback signal FB2 and a second input terminal configured to receive slope compensation signal Ramp, and an output terminal configured to provide a difference between input current feedback signal FB2 and slope compensation signal Ramp. Comparison circuit 644 has a non-inverting terminal coupled to the output terminal of digital-to-analog conversion unit 23_2 to receive reference signal Ref2, an inverting terminal coupled to the output terminal of operation circuit 643, and an output terminal configured to provide input current loop control signal Ct2. Analog control loop 24_3 comprises an operation circuit 645 and a comparison circuit 646. Operation circuit 645 has a first input terminal configured to receive battery voltage feedback signal FB3 and a second input terminal configured to receive slope compensation signal Ramp, and an output terminal configured to provide a difference between battery voltage feedback signal FB3 and slope compensation signal Ramp. Comparison circuit 646 has a non-inverting terminal coupled to the output terminal of digital-to-analog conversion unit 23_3 to receive reference signal Ref3, an inverting terminal coupled to the output terminal of operation circuit 645, and an output terminal configured to provide battery voltage loop control signal Ct3. Analog control loop 24_4 comprises an operation circuit 647 and a comparison circuit 648. Operation circuit 647 has a first input terminal configured to receive battery charging current feedback signal FB4 and a second input terminal configured to receive slope compensation signal Ramp, and an output terminal configured to provide a difference between battery charging current feedback signal FB4 and slope compensation signal Ramp. Comparison circuit 647 has a non-inverting terminal coupled to the output terminal of digital-to-analog conversion unit 23_4 to receive reference signal Ref4, an inverting terminal coupled to the output terminal of operation circuit 647, and an output terminal configured to provide battery charging current loop control signal Ct4.

Digital control unit 25 comprises an AND gate 651 and a RS flip-flop 652. AND gate 651 comprises a first input terminal coupled to the output terminal of comparison circuit 642 to receive input voltage loop control signal Ct1, a second input terminal coupled to the output terminal of comparison circuit 644 to receive input current loop control signal Ct2, a third input terminal coupled to the output terminal of comparison circuit 646 to receive battery voltage loop control signal Ct3, a fourth input terminal coupled to the output terminal of comparison circuit 648 to receive battery charging current loop control signal Ct4, and an output terminal configured to provide a set signal Set. RS flip-flop 652 has a set terminal S coupled to the output terminal of AND gate 651 to receive set signal Set, a reset terminal R configured to receive time period control signal TCON, a non-inverting output terminal Q configured to provide switching control signal PWM1 to control switch S1, and an inverting output terminal /Q configured to provide switching control signal PWM2 to control switch S2. When all of loop control signals Ct1-Ct4 is high voltage level, switch S1 is turned ON. In one embodiment, switch S1 is turned OFF when an ON time period of switch S1 equals a predetermined time period controlled by time period control signal TCON. Digital control unit 25 further provides digital slope control signal CRA and digital reference signal DRef1-DRef4.

In one embodiment, battery charging system 200c is configured to generate reference signal Ref1 based on a difference between digital reference signal DRef1 and input voltage error compensation signal Vc1, generate reference signal Ref2 based on a difference between digital reference signal DRef2 and input current error compensation signal Vc2, generate reference signal Ref3 based on a difference between digital reference signal DRef3 and battery voltage error compensation signal Vc3, and generate reference signal Ref4 based on a difference between digital reference signal DRef4 and battery charging current error compensation signal Vc4. One of ordinary skill in the art should understand that error compensation signals Vc1-Vc4 may be positive or negative. Digital control unit 25 further comprises operation modules 657-659 and 650. Operation module 657 has a first input terminal coupled to the output terminal of output module 256 to receive input voltage error compensation signal Vc1, a second input terminal configured to receive digital reference signal DRef1, and an output terminal coupled to the input terminal of digital-to-analog conversion unit 23_1 to provide a difference between digital reference signal DRef1 and input voltage error compensation signal Vc1. The output terminal of digital-to-analog conversion unit 23_1 is configured to provide reference signal Ref1 based on the difference between digital reference signal DRef1 and input voltage error compensation signal Vc1. Operation module 658 has a first input terminal coupled to the output terminal of output module 256 to receive input current error compensation signal Vc2, a second input terminal configured to receive digital reference signal DRef2, and an output terminal coupled to the input terminal of digital-to-analog conversion unit 23_2 to provide a difference between digital reference signal DRef2 and input current error compensation signal Vc2. The output terminal of digital-to-analog conversion unit 23_2 is configured to provide reference signal Ref2 based on the difference between digital reference signal DRef2 and input current error compensation signal Vc2. Operation module 659 has a first input terminal coupled to the output terminal of output module 256 to receive battery voltage error compensation signal Vc3, a second input terminal configured to receive digital reference signal DRef3, and an output terminal coupled to the input terminal of digital-to-analog conversion unit 23_3 to provide a difference between digital reference signal DRef3 and battery voltage error compensation signal Vc3. The output terminal of digital-to-analog conversion unit 23_3 is configured to provide reference signal Ref3 based on the difference between digital reference signal DRef3 and battery voltage error compensation signal Vc3. Operation module 650 has a first input terminal coupled to the output terminal of output module 256 to receive battery charging current error compensation signal Vc4, a second input terminal configured to receive digital reference signal DRef4, and an output terminal coupled to the input terminal of digital-to-analog conversion unit 23_4 to provide a difference between digital reference signal DRef4 and battery voltage error compensation signal Vc4. The output terminal of digital-to-analog conversion unit 23_4 is configured to provide reference signal Ref4 based on the difference between digital reference signal DRef4 and battery voltage error compensation signal Vc4.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A battery charging system, comprising:
an input terminal, configured to receive an input voltage and an input current;
an output terminal, coupled to a battery and configured to provide a battery voltage and a battery charging current to charge the battery;
a first switch, coupled between the input terminal and the output terminal;
an input voltage control loop, configured to receive an input voltage feedback signal representative of the input voltage, a slope compensation signal and an input voltage reference signal, and configured to provide a first loop control signal via comparing the input voltage reference signal with a first compounded signal obtained by a subtraction between the input voltage feedback signal and the slope compensation signal;
an input current control loop, configured to receive an input current feedback signal representative of the input current of the battery charging system, the slope compensation signal and an input current reference signal, and configured to provide a second loop control signal via comparing the input current reference signal with a second compounded signal obtained by a summation of the input current feedback signal and the slope compensation signal;
a battery voltage control loop, configured to receive a battery voltage feedback signal representative of the battery voltage, the slope compensation signal and a battery voltage reference signal, and configured to provide a third loop control signal via comparing the battery voltage reference signal with a third compounded signal obtained by a summation of the battery voltage feedback signal and the slope compensation signal;
a battery charging current control loop, configured to receive a battery charging current feedback signal representative of the battery charging current, the compensation signal, and a battery charging current reference signal, and configured to provide a fourth loop control signal via comparing the battery charging current reference signal with a fourth compounded signal obtained by a summation of the battery charging current feedback signal and the slope compensation signal; and
a digital control unit, configured to receive the first loop control signal, the second loop control signal, the third loop control signal and the fourth loop control signal, and configured to provide a switching control signal to control the first switch automatically in response to one of the input voltage control loop, the input current control loop, the battery voltage control loop and the battery charging current control loop.

2. The battery charging system of claim 1, wherein when one of the first loop control signal, the second loop control signal, the third loop control signal and the fourth loop control signal transits to a first state, the switching control signal is configured to turn OFF the first switch, and the switching control signal is configured to turn ON the first switch again until a predetermined OFF time period expires.

3. The battery charging system of claim 2, wherein the digital control unit further comprises:
- an OR gate, configured to receive the first loop control signal, the second loop control signal, the third loop control signal and the fourth loop control signal, and configured to provide a reset signal via an OR operation on the first loop control signal, the second loop control signal, the third loop control signal and the fourth loop control signal; and
- a RS flip-flop, having a set terminal, a reset terminal and an output terminal, wherein the set terminal is configured to receive a time period control signal to control the predetermined OFF time period, the reset terminal is coupled to the OR gate to receive the reset signal, and the output terminal is configured to provide the switching control signal based on the time period control signal and the reset signal.

4. The battery charging system of claim 1, wherein when all of the first loop control signal, the second loop control signal, the third loop control signal and the fourth loop control signal are a first state, the switching control signal is configured to turn ON the first switch, and the switching control signal is configured to turn OFF the first switch again until a predetermined ON time period expires.

5. The battery charging system of claim 4, wherein the digital control unit further comprises:
- an AND gate, configured to receive the first loop control signal, the second loop control signal, the third loop control signal and the fourth loop control signal, and configured to provide a set signal via an AND operation on the first loop control signal, the second loop control signal, the third loop control signal and the fourth loop control signal; and
- a RS flip-flop, having a set terminal, a reset terminal and an output terminal, wherein the set terminal is coupled to the AND gate to receive the set signal, the reset terminal is configured to receive a time period control signal to control the predetermined ON time period, and the output terminal is configured to provide the switching control signal based on the time period control signal and the set signal.

6. The battery charging system of claim 1, wherein the digital control unit is further configured to provide a digital slope control signal to adjust an amplitude of the slope compensation signal, wherein the control circuit is configured to provide the slope compensation signal based on the digital slope control signal and the switching control signal.

7. A battery charging system having an input terminal and an output terminal coupled to a battery, comprising:
- a first switch, coupled between the input terminal of the battery charging system and the output terminal of the battery charging system;
- a plurality of analog control loops, configured to receive a plurality of reference signals, a plurality of feedback signals and a slope compensation signal, and configured to provide a plurality of loop control signals based on the plurality of reference signals, the plurality of feedback signals and the slope compensation signal; wherein the plurality of analog control loops comprises an input voltage control loop, configured to receive an input voltage feedback signal representative of an input voltage, the slope compensation signal and an input voltage reference signal, and configured to provide a first loop control signal via comparing the input voltage reference signal with a first compounded signal obtained by a subtraction between the input voltage feedback signal and the slope compensation signal;
- a digital control unit, configured to receive the plurality of loop control signals, and configured to provide a switching control signal to control the first switch automatically in response to one of the plurality of analog control loops, wherein when one of the plurality of loop control signals transits to a first state, the switching control signal is configured to turn OFF the first switch, and to turn ON the first switch again until a predetermined OFF time period expires.

8. The battery charging system of claim 7, wherein each of the plurality of the analog control loops further comprises:
- a comparison circuit, having a first input terminal, a second input terminal and an output terminal, wherein the first input terminal is configured to receive a compounded signal comprising an information of the slope compensation signal and an information of one of the plurality of feedback signals, the second input terminal is configured to receive one of the plurality of reference signals, and the output terminal is configured to provide a loop control signal via comparing the compounded signal with one of the plurality of reference signals.

9. The battery charging system of claim 8, wherein each of the plurality of the analog control loops further comprises:
- an operation circuit, having a first input terminal, a second input terminal and an output terminal, wherein the first input terminal is configured to receive one of the plurality of feedback signals, the second input terminal is configured to receive the slope compensation signal, and the output terminal is coupled to the first input terminal of the comparison circuit to provide the compounded signal.

10. The battery charging system of claim 7, wherein the digital control unit further comprises:
- an OR gate, having a plurality of input terminals and an output terminal, wherein the plurality of input terminals are configured to receive the plurality of loop control signals, and the output terminal is configured to provide a reset signal based on the plurality of loop control signals; and
- a logic circuit, having a first input terminal, a second input terminal and an output terminal, wherein the first input terminal is coupled to the output terminal of the OR gate to receive the reset signal, the second input terminal is configured to receive a time period control signal, and the output terminal is configured to provide the switching control signal to control the first switch based on the reset signal and the time period control signal, wherein the first switch is turned OFF based on the reset signal, and the first switch is turned ON based on the time period control signal.

11. The battery charging system of claim 7, wherein the digital control unit is further configured to provide a plurality of digital reference signals, and the battery charging system further comprises a plurality of digital-to-analog conversion units, configured to provide the plurality of reference signals based on the plurality of digital reference signals.

12. The battery charging system of claim 11, wherein the digital control unit further comprises:
- an analog-to-digital conversion unit, configured to provide a digital signal based on one of the plurality of feedback signals;
- a digital compensation loop, configured to provide a plurality of error compensation signals, wherein each of the plurality of error compensation signal is generated based on a difference between the digital signal and one of the plurality of corresponding digital reference signals; and a plurality of operation modules, each of the plurality of operation modules is configured to provide a summation of one of the plurality of error compensation signals and one of the plurality of digital reference signals to one of the plurality of digital-to-analog conversion units; wherein each of the plurality of digital-to-analog conversion units is configured to provide one of the plurality of reference signals via digital-to-analog converting of the summation of one of the plurality of error compensation signals and one of the plurality of digital reference signals.

13. A control circuit for a battery charging system, the battery charging system having a switching circuit, and the control circuit comprising:

a plurality of analog control loops, configured to receive a plurality of reference signals, a plurality of feedback signals and a slope compensation signal, and configured to provide a plurality of loop control signals based on the plurality of reference signals, the plurality of feedback signals and the slope compensation signal;

a digital control unit, configured to receive the plurality of loop control signals and provide a switching control signal to control the switching circuit based on the plurality of loop control signals, the digital control unit is further configured to provide a digital slope control signal to adjust an amplitude of the slope compensation signal, wherein the digital control unit automatically chooses one of the plurality of analog control loops to control the switching circuit; and a slope generating unit, configured to provide the slope compensation signal based on the digital slope control signal and the switching control signal wherein the digital control unit is further configured to provide a plurality of digital reference signals, and the control circuit is configured to provide the plurality of reference signals based on the plurality of digital reference signals;

wherein the digital control unit further comprises:

an analog-to-digital conversion unit, configured to provide a digital signal based on analog-to-digital converting of one of the plurality of feedback signals;

a digital compensation loop, configured to provide a plurality of error compensation signals, wherein each of the plurality of error compensation signal is generated based on a difference between the digital signal and one of the plurality of digital reference signals;

a plurality of operation modules, each of the plurality of operation modules is configured to provide a summation of one of the plurality of error compensation signals and one of the plurality of digital reference signals; and a plurality of digital-to-analog conversion units, each of the plurality of digital-to-analog conversion units having an input terminal coupled to one of the plurality of operation modules to receive the summation of one of the plurality of error compensation signals and one of the plurality of digital reference signals, and an output terminal configured to provide one of the plurality of reference signals via digital-to-analog converting.

14. The control circuit of claim 13, wherein each of the plurality of the analog control loops is configured to provide a loop control signal via comparing one of the plurality of feedback signals with one of the plurality of reference signals, wherein one of the plurality of feedback signals or one of the plurality of reference signals comprises an information of the slope compensation signal.

15. The control circuit of claim 14, wherein each of the plurality of the analog control loops further comprises:

an operation circuit, having a first input terminal, a second input terminal and an output terminal, wherein the first input terminal is configured to receive one of the plurality of feedback signals, and the second input terminal is configured to receive the slope compensation signal; and a comparison circuit, having a first input terminal, a second input terminal and an output terminal, wherein the first input terminal is coupled to the output terminal of the operation circuit, the second input terminal is configured to receive one of the plurality of reference signals, and the output terminal is configured to provide the loop control signal based on one of the plurality of reference signals, one of the plurality of feedback signals and the slope compensation signal.

16. The control circuit of claim 13, wherein the digital control unit further comprises:

an OR gate, having a plurality of input terminals and an output terminal, wherein the plurality of input terminals are configured to receive the plurality of loop control signals, and the output terminal is configured to provide a reset signal based on the plurality of loop control signals; and a logic circuit, configured to receive the reset signal and provide the switching control signal based on the reset signal, wherein the switching control signal is configured to turn OFF the switching circuit based on the reset signal, and turn ON the switching circuit again until a predetermined OFF time period expires.

17. The control circuit of claim 13, wherein the digital control unit further comprises:

an AND gate, having a plurality of input terminals and an output terminal, wherein the plurality of input terminals are configured to receive the plurality of loop control signals, the output terminal is configured to provide a set signal based on the plurality of loop control signals; and a logic circuit, configured to receive the set signal and provide the switching control signal based on the set signal, wherein the switching control signal is configured to turn ON the switching circuit based on the set signal, and turn OFF the switching circuit again until a predetermined ON time period expires.

18. The control circuit of claim 13, wherein the slope generating unit further comprises:

a current source, configured to provide a charging current, wherein the charging current is adjusted based on the digital slope control signal;

a capacitor, having a first terminal coupled to the current source to receive the charging current, and a second terminal coupled to a system ground, wherein a voltage across the capacitor is the slope compensation signal; and a switch, coupled to the capacitor in parallel, wherein the switch is turned ON and turned OFF based on the switching control signal.

* * * * *